(12) United States Patent
Brett et al.

(10) Patent No.: US 10,876,433 B2
(45) Date of Patent: Dec. 29, 2020

(54) POWER RECOVERY

(71) Applicant: Highview Enterprises Limited, London (GB)

(72) Inventors: Stephen Gareth Brett, Reading (GB); Chris Bailey, Kingston (GB)

(73) Assignee: Highview Enterprises Limited, London (GB)

( * ) Notice: Subject to any disclaimer, the term of this patent is extended or adjusted under 35 U.S.C. 154(b) by 0 days.

(21) Appl. No.: 16/074,736

(22) PCT Filed: Feb. 2, 2017

(86) PCT No.: PCT/GB2017/050262
§ 371 (c)(1),
(2) Date: Aug. 1, 2018

(87) PCT Pub. No.: WO2017/134444
PCT Pub. Date: Aug. 10, 2017

(65) Prior Publication Data
US 2019/0353056 A1    Nov. 21, 2019

(30) Foreign Application Priority Data
Feb. 2, 2016 (GB) .................................. 1601878.0

(51) Int. Cl.
*F01K 25/10* (2006.01)
*F01K 7/16* (2006.01)
(Continued)

(52) U.S. Cl.
CPC ................ *F01K 25/10* (2013.01); *F01K 7/16* (2013.01); *F01K 19/04* (2013.01); *F02C 1/02* (2013.01); *F02C 1/10* (2013.01)

(58) Field of Classification Search
CPC . F01K 25/10; F01K 19/04; F01K 7/16; F01K 7/02; F02C 1/10; F02C 1/02
(Continued)

(56) References Cited

U.S. PATENT DOCUMENTS 2,960,834 A    11/1960 Kirk Patrick
3,358,460 A    12/1967 Smith et al.
(Continued)

FOREIGN PATENT DOCUMENTS

CN    102102586 A    6/2011
CN    104093942 A    10/2014
(Continued)

OTHER PUBLICATIONS

International Search Report and Written Opinion dated May 11, 2017 in connection with International Application No. PCT/GB2017/050262.
(Continued)

*Primary Examiner* — Hoang M Nguyen
(74) *Attorney, Agent, or Firm* — Wolf, Greenfield & Sacks, P.C.

(57) ABSTRACT

A system comprising a cryogenic storage tank for storing cryogen, a pump in fluid communication with the cryogenic storage tank for pumping cryogen from the cryogenic storage tank to a high pressure, an evaporator in fluid communication with the pump for evaporating the high-pressure cryogen from the pump to form a high-pressure gas, a power recovery apparatus comprising a drive shaft for transmitting mechanical power, and an electrical machine mechanically coupled to the drive shaft of the power recovery apparatus for converting the mechanical power recovered by the power recovery apparatus into electrical energy. The system is operable in a power recovery mode in which the power recovery apparatus is driven by and recovers mechanical
(Continued)

power from high-pressure gas supplied by the evaporator, and a motored mode in which the power recovery apparatus is driven by a driving means other than high-pressure gas supplied by the evaporator.

36 Claims, 7 Drawing Sheets

(51) Int. Cl.
 *F01K 19/04* (2006.01)
 *F02C 1/02* (2006.01)
 *F02C 1/10* (2006.01)

(58) Field of Classification Search
 USPC .................................................. 60/651, 671
 See application file for complete search history.

(56) References Cited

U.S. PATENT DOCUMENTS

| | | | |
|---|---|---|---|
| 3,451,342 | A | 6/1969 | Schwartzman |
| 3,830,326 | A | 8/1974 | Hartung |
| 3,919,852 | A | 11/1975 | Jones |
| 3,998,059 | A | 12/1976 | Randell |
| 4,329,842 | A | 5/1982 | Hoskinson |
| 4,455,834 | A | 6/1984 | Earle |
| 4,545,795 | A | 10/1985 | Liu et al. |
| 4,695,302 | A | 9/1987 | Tyree, Jr. |
| 4,765,143 | A | 8/1988 | Crawford et al. |
| 5,139,547 | A | 8/1992 | Agrawal et al. |
| 5,272,879 | A | 12/1993 | Wiggs |
| 6,282,901 | B1 | 9/2001 | Marin et al. |
| 6,293,126 | B1 | 9/2001 | Higginbotham |
| 6,349,787 | B1 | 2/2002 | Dakhil |
| 6,405,541 | B1 | 6/2002 | Brunnhofer |
| 6,484,533 | B1 | 11/2002 | Allam et al. |
| 6,871,502 | B2 | 3/2005 | Marin et al. |
| 6,920,759 | B2 | 7/2005 | Wakana et al. |
| 7,043,925 | B2 | 5/2006 | Haberbusch |
| 7,047,744 | B1 | 5/2006 | Robertson et al. |
| 7,093,528 | B2 | 8/2006 | McFarland |
| 9,890,712 | B2 | 2/2018 | Morgan et al. |
| 2001/0004830 | A1 | 6/2001 | Wakana et al. |
| 2002/0166323 | A1 | 11/2002 | Marin et al. |
| 2002/0174678 | A1 | 11/2002 | Wilding et al. |
| 2003/0074895 | A1* | 4/2003 | McFarland .............. F01K 25/10 60/395 |
| 2003/0101728 | A1 | 6/2003 | Wakana et al. |
| 2003/0143448 | A1* | 7/2003 | Keefer ................. B01D 53/047 429/9 |
| 2005/0126176 | A1 | 6/2005 | Fletcher et al. |
| 2005/0132746 | A1 | 6/2005 | Brugerolle et al. |
| 2006/0026988 | A1 | 2/2006 | Unger |
| 2006/0078034 | A1 | 4/2006 | Coffinberry |
| 2007/0006599 | A1 | 1/2007 | Kawamura et al. |
| 2007/0062194 | A1 | 3/2007 | Ingersoll |
| 2007/0163261 | A1* | 7/2007 | Strathman ............... F01K 23/00 60/651 |
| 2008/0216510 | A1 | 9/2008 | Vandor et al. |
| 2009/0282840 | A1 | 11/2009 | Chen et al. |
| 2009/0293503 | A1 | 12/2009 | Vandor |
| 2009/0320476 | A1 | 12/2009 | Ding |
| 2011/0132032 | A1 | 6/2011 | Gatti et al. |
| 2012/0151961 | A1 | 6/2012 | Ha et al. |
| 2014/0217739 | A1 | 8/2014 | Morgan et al. |
| 2015/0000280 | A1 | 1/2015 | Harris et al. |
| 2015/0192358 | A1 | 7/2015 | Morgan et al. |
| 2015/0291007 | A1* | 10/2015 | Ayres ...................... F25B 9/004 62/50.1 |
| 2015/0381025 | A1 | 12/2015 | Goldman et al. |
| 2016/0178129 | A1 | 6/2016 | Chen et al. |

FOREIGN PATENT DOCUMENTS

| | | |
|---|---|---|
| CN | 104806312 A | 7/2015 |
| CN | 104879178 A | 9/2015 |
| CN | 105587353 A | 5/2016 |
| DE | 1036282 B | 8/1958 |
| DE | 1551597 A1 | 4/1970 |
| DE | 2434238 A1 | 1/1976 |
| DE | 10147047 A1 | 7/2002 |
| EP | 0 171 952 A1 | 2/1986 |
| EP | 2 397 668 A2 | 12/2011 |
| FR | 2489411 A | 3/1982 |
| GB | 822122 | 10/1959 |
| GB | 1 115 689 A | 5/1968 |
| GB | 1 344 198 | 1/1974 |
| GB | 2 494 400 A | 3/2013 |
| GB | 1115336.8 A | 3/2013 |
| JP | S43-26656 | 11/1968 |
| JP | S60-248976 A | 12/1985 |
| JP | H02-176386 A | 7/1990 |
| JP | 4-132837 A | 5/1992 |
| JP | H05-045050 A1 | 2/1993 |
| JP | H05-068424 B | 9/1993 |
| JP | 9-191586 A | 7/1997 |
| JP | 9-250360 A | 9/1997 |
| JP | 1026469 A | 1/1998 |
| JP | 10-238367 A | 9/1998 |
| JP | 11-303646 A | 11/1999 |
| JP | 2000-130185 A | 5/2000 |
| JP | 2001-193483 A | 7/2001 |
| JP | 2002-242694 A | 8/2002 |
| JP | 2002-339760 A | 11/2002 |
| JP | 2003-254086 A | 9/2003 |
| JP | 2004-150685 A | 5/2004 |
| SU | 1710824 A1 | 2/1992 |
| WO | WO 90/08295 A1 | 7/1990 |
| WO | WO 91/05145 A1 | 4/1991 |
| WO | WO 01/44735 A1 | 6/2001 |
| WO | WO 2007/021351 A1 | 2/2007 |
| WO | WO 2007/096656 A1 | 8/2007 |
| WO | WO 2009/029140 A1 | 3/2009 |
| WO | WO 2009/072900 A1 | 6/2009 |
| WO | WO 2013/034908 A2 | 3/2013 |

OTHER PUBLICATIONS

International Preliminary Report on Patentability dated Aug. 7, 2018 in connection with International Application No. PCT/GB2017/050262.
PCT/GB2007/000667, Jun. 22, 2007, International Search Report and Written Opinion.
PCT/GB2007/000667, Sep. 2, 2008, International Preliminary Report on Patentability.
PCT/GB2013/051797, Jun. 19, 2015, International Search Report and Written Opinion.
PCT/GB2013/051797, Jun. 23, 2015, International Preliminary Report on Patentability.
GB 1212056.4, Nov. 20, 2012, Search Report.
GB 1305641.1, Jun. 14, 2013, Search Report.
EP 1989400, Jan. 3, 2018, European Opposition Statement.
EP 1989400, Jul. 26, 2019, Grounds for the Decision of the Opposition Division.
U.S. Appl. No. 12/280,739, filed Mar. 11, 2009, Chen et al.
U.S. Appl. No. 15/053,840, filed Feb. 25, 2016, Chen et al.
U.S. Appl. No. 14/411,533, filed Dec. 29, 2014, Morgan et al.
International Search Report and Written Opinion dated Jun. 22, 2007 in connection with International Application No. PCT/GB2007/000667.
International International Preliminary Report on Patentability dated Sep. 2, 2008 in connection with International Application No. PCT/GB2007/000667.
International Search Report and Written Opinion dated Jun. 19, 2015 in connection with International Application No. PCT/GB2013/051797.
International International Preliminary Report on Patentability dated Jun. 23 2015 in connection with International Application No. PCT/GB2013/051797.

(56) References Cited

OTHER PUBLICATIONS

GB Search Report under Section 17 for priority application GB1212056.4 dated Nov. 20, 2012.
GB Search Report under Section 17 for priority application GB1305641.1 dated Jun. 14, 2013.
European Opposition Statement dated Jan. 3, 2018 in connection with European Patent EP1989400 along with Google French-to-English translation.
Grounds for the Decision of the Opposition Division dated Jul. 26, 2019 in connection with European Patent No. EP1989400.
Australian Examiner's Report dated May 29, 2012 in connection with Australian Patent Application No. 2007217133.
Examination Report of the The Patent Office of India dispatched Nov. 24, 2016.
Japan Notice of Reasons for Rejection dated May 31, 2011 and English translation thereof in connection with Japanese Application No. 2008-555877.
Chinese Office Action dated Mar. 2, 2016 and English translation thereof in connection with Chinese Patent Application No. 201380036129.1.
Japanese Notice of Reasons for Rejection dated Mar. 29, 2016 in connection with Japanese Application No. 2015-519359.
Singapore Search Report and Written Opinion dated Feb. 23, 2015 from counterpart application No. 11201408706P.
[No Author Listed], File:Scheme LOX.jpg from Wikipedia dated May 23, 2012. [http://en.wikipedia.org/wiki/File:SchemeLOX.jpg].
Bernstein, Cryogenic Consulting Service, Inc.: Cryogenic Argon Production, A Technology Review Paper for Presentation at the 1988 Modern Air Separation Plant Technology Conference Jul. 26-27, 1999 at Chengdu, People's Republic of China by Joseph T. Bernstein, Cryogenic Consulting Service, Inc. Jun. 29, 2004: 18 pages.
Castle, Air Separation and Liquefaction: Recent Developments and Prospects for the Beginning of the New Millennium. Lnternational Journal of Refrigeration. 2002: 25:158-172.
Chino et al., Evaluation of Energy Storage Method Using Liquid Air Heat Transfer. Heat Transfer-Asian Research. 2000; 29(5):347-357.
Cornelissen et al., Exergy Analysis of Cryogenic Air Separation. Flowers. 1997; 931-937.
Database WPI Week 199252, Derwent Publications Ltd. London, GB AN 1992-431396 XP002436877 & SU 1 710 824 A1 (Univ DNEPR) Feb. 7, 1992.
Denholm et al., Life Cycle Energy Requirements and Greenhouse Gas Emissions From Large Scale Energy Storage Systems. Energy Conversion and Management. 2004; 45 (2004): 2153-2172.
Kondoh et al., Electrical Energy Storage Systems for Energy Networks. Energy Conversion & Management. 2000; 41:1863-1874.
McLarnon et al., Energy Storage. Annual Rev. Energy. 1989; 14: 241-271.
Shah et al., Fundamentals of Heat Exchanger Design. 2003; 17 pages.
Shah et al., Fundamentals of Heat Exchanger Design. 2003; pp. 5-7.
Smith, Storage of Electrical Energy Using Supercritical Liquid Air. Proc Instn Mech Engrs. 1977: 191 (27/77): 289-298.

\* cited by examiner

POWER RECOVERY

RELATED APPLICATIONS

This Application is a national stage filing under 35 U.S.C. 371 of International Patent Application Serial No. PCT/GB2017/050262, filed Feb. 2, 2017, which claims priority to United Kingdom application number 1601878.0, filed Feb. 2, 2016, each of which is herein incorporated by reference in its entirety.

FIELD OF THE INVENTION

The present invention relates to power recovery systems and methods, particularly cryogenic power recovery systems and methods.

BACKGROUND TO THE INVENTION

Electricity transmission and distribution networks (or grids) must balance the generation of electricity with demand from consumers. At present, this is normally achieved by modulating the generation side (supply side) of the network by turning power stations on and off and/or continuously running some power stations at near-full load so that power output may be increased or decreased as necessary either by reducing the load set-point or by taking the plant off the grid. The overall balance must be maintained on a second-by-second basis.

Power plants that are typically run continuously at near-full load to optimise the electricity production efficiency, rather than being turned on and off, are sometimes known as baseload plants. These typically involve a thermodynamic steam cycle. Typical examples include nuclear plants, coal-fired plants and combined-cycle gas turbines, where the steam cycle is heated using the exhaust heat of a combustion gas turbine. Such thermodynamic steam plants cannot be turned on and off quickly as it takes a long time to raise the temperature of the temperature source (nuclear reactor, furnace, gas turbine) and the steam cycle. Total start-up time is typically 45 minutes for a combined-cycle gas turbine and several hours for a nuclear or coal-fired plant. These plants are therefore run at slightly lower load and can respond to an increase in electricity demand by raising their load set-point. Since these plants are already running, such a response may typically be achieved in a few seconds.

Power plants that are turned on for short periods to meet peak demand are sometimes referred to as peaking plants. Peaking plants are designed to provide faster response but to the detriment of efficiency. Therefore, balancing the supply side in the way described above results in an efficiency penalty. At large scale, these are typically open-cycle gas turbines, which burn gas in a gas turbine similar to a jet engine. Air is compressed with a compressor, mixed with flammable gas and combusted in a combustion chamber. The resulting high-pressure hot gas is expanded in a turbine to generate work, which is converted to electrical energy in an electrical generator. The hot exhaust from the turbine is exhausted to atmosphere, as opposed to being used in closed cycle gas turbines, where it is used to heat a steam cycle, which takes time to heat up as discussed previously. Open-cycle gas turbine plants may typically start in around 15 minutes. This is primarily limited by the need to purge the exhaust stack of any latent flammable gas that could cause an explosion and the requirement to heat the turbine to its operating temperature in a controlled manner in order to avoid rapid thermal shocks. These plants are therefore called in anticipation of high electricity demand, to allow for the time taken to start up the system.

A large range of peaking plants based on various technologies and thus exhibiting different start-up durations is currently available. These plants may be sorted into two main classes:

non-thermodynamic-based systems (e.g. batteries, hydro-electric plants, flywheels), and thermodynamic-based systems (e.g. open-cycle gas turbines (OCGT), compressed-air energy storage (CAES), liquid air energy storage—(LAES)).

In hydro-electric peaking plants (non-thermodynamic), water is allowed to flow from height through a turbine in order to drive a generator. Because the energy is simply embodied in the potential energy of the mass of water held at height, it is relatively quick to start the power plant simply by opening a valve and admitting water to the turbine. In this case, the start-up time is limited by the time taken for the turbine to reach nominal speed and for the speed to be precisely controlled to be synchronous with the electricity grid before the generator is coupled to the grid. In order to reduce the time required to react to a power output signal, hydro-electric plants may be designed to run up to synchronisation and then to remain coupled to the grid but with the flow of water turned off. In this mode, the turbine continues to spin and the generator operates as a motor, being coupled to the grid. When power is required, a valve is simply opened to admit water to the turbine and generate power. In this manner, the plant can switch from an idle spinning state to nominal power export in less than a minute. Hydro-electric peaking plants offer the further advantage of benign emissions, but require specific geographical features to be constructed, which limits their deployability.

To combat global warming, an increasing volume of intermittent renewable generation capacity, including wind turbines and solar collectors, is being introduced to the networks, and this further complicates the balancing of the grids by creating uncertainty in the availability of portions of the generation side; a problem that can be addressed using energy storage.

Energy storage devices and systems typically have three phases of operation: charge, store and discharge. Energy storage devices typically generate power (discharge) on a highly intermittent basis when there is a shortage of generating capacity on the transmission and distribution network. This can be signalled to the storage device operator by a high price for electricity in the local power market or by a request from the organisation responsible for the operating of the network for additional capacity. In some countries, such as the United Kingdom, the network operator enters into contracts for the supply of back-up reserves to the network with operators of power plants with rapid start capability. Such contracts can cover months or even years, but typically the time the power provider will be operating (generating power) is very short. In addition, a storage device can provide an additional service in providing additional load at times of oversupply of power to the grid from intermittent renewable generators. Wind speeds are often high overnight when demand is low. The network operator must either arrange for additional demand on the network to utilise the excess supply, through low energy price signals or specific contracts with consumers, or constrain the supply of power from other stations or the wind farms. In some cases, especially in markets where wind generators are subsidised, the network operator will have to pay the wind farm operators to 'turn off' the wind farm. A storage device offers the network operator a useful additional load that can be used to balance the grid in times of excess supply.

For a storage system or device to be commercially viable the following factors are important: capital cost per MW (power capacity), capital cost per MWh (energy capacity), round trip cycle efficiency, lifetime with respect to the number of charge and discharge cycles that can be expected from the initial investment and the speed of start-up. For widespread utility scale applications, it is also important that the storage device is geographically unconstrained i.e. it can be built anywhere, in particular next to a point of high demand or next to a source of intermittency or a bottleneck in the transmission and distribution network.

There is therefore a need for environmental-friendly, non-geographically constrained, low capital cost, economically-viable and fast-responding energy-storage devices and systems and systems and methods for recovering power from these energy-storage devices and systems.

SUMMARY OF THE INVENTION

Liquid Air Energy Storage (LAES) enables the storage of energy using a cryogen (such as liquid air or liquid nitrogen) and the subsequent power recovery by thermodynamically processing it into a high-pressure gas able to drive a turbo-expander coupled to a generator to generate electricity. LAES accordingly employs harmless substances (unlike batteries and OCGT), is not geographically-constrained (unlike hydro-electric plants) and offers a number of advantages in the market place. Broadly speaking a LAES system would typically, in its charge phase, utilise low cost or surplus electricity, at periods of low demand or excess supply from intermittent renewable generators, to liquefy a working fluid such as air or nitrogen during a first liquefaction phase. This is then stored as a cryogenic fluid in a storage tank during a storage phase, and subsequently pumped to high pressure in a cryogenic pump, evaporated and used to drive a turbine, producing electricity during a discharge, or power recovery, phase, at periods of high demand or insufficient supply from intermittent renewable generators.

LAES is a thermodynamic process. Similarly to other thermodynamic processes, a major portion of the time required to start up the power recovery phase is taken to reach operating temperature (in particular to cool the cryogenic pump) and to spin the turbo-expander up to speed and to finely control its rotational velocity in order to synchronise the generator to the grid, the generator being mechanically coupled to the turbo-expander via a drive shaft. Start-up time typically takes several minutes.

The speed of rotation at which the generator must turn in order to electro-magnetically couple to the grid is known to the skilled person as synchronous speed. This speed depends on the number of magnetic poles on the generator rotor and on the frequency of the grid—for example 50 Hz in Europe and 60 Hz in the United States. Hereafter, synchronous speed will also be used in reference to turbo-expanders and expansion stages. The skilled person will understand that this does not necessarily imply the same rotational speed as the generator, since turbo-expanders or individual expansion stages composing turbo-expanders may be coupled to the generator through a gear box, meaning that the rotational speed corresponding to the synchronous speed of the generator may be different.

The term synchronous speed is therefore intended in this specification to mean the speed of rotation of the item of rotating equipment in question that corresponds to the generator being synchronous with the grid.

A turbo-expander shall be understood to be a rotary expansion machine comprising one or more stages of expansion, each comprising at least one expansion wheel located in a casing (expansion stages). These expansion stages may either be connected to a common drive shaft rotating at the same speed (this includes multiple shafts mechanically coupled together), or to multiple shafts rotating at different speeds and connected through a gearbox to at least one drive shaft.

An expansion stage may share at least one of said multiple shafts with at least one other expansion stage. For example, a turbo-expander may comprise four expansion stages arranged on two shafts (two stages per shaft) rotating at a first and second speed and connected via a gearbox to a drive shaft rotating at a third speed. Expansion stages may comprise more than one wheel in more than one respective casing, connected in parallel in the gas flow.

Typically, the drive shaft is connected to an electrical generator to convert the mechanical power at the drive shaft into electrical power at the electrical terminals of the generator.

The present inventors have advantageously invented a system and method which reduce the time required to start up the power recovery phase of a LAES system and export power to the grid. This is of huge benefit given that electrical grids will only become more volatile with the introduction of more intermittent renewable generation capacity.

In accordance with an aspect of the present invention, there is provided a system comprising:
  a cryogenic storage tank for storing cryogen;
  a pump in fluid communication with the cryogenic storage tank for pumping cryogen from the cryogenic storage tank to a high pressure;
  an evaporator in fluid communication with the pump for evaporating the high-pressure cryogen from the pump to form a high-pressure gas;
  a power recovery apparatus comprising a drive shaft for transmitting mechanical power; and
  an electrical machine mechanically coupled to the drive shaft of the power recovery apparatus for converting the mechanical power recovered by the power recovery apparatus into electrical energy,
  wherein the system is operable in:
    a power recovery mode in which the power recovery apparatus is driven by and recovers mechanical power from high-pressure gas supplied by the evaporator; and
    a motored mode in which the power recovery apparatus is driven by a driving means other than high-pressure gas supplied by the evaporator.

The provision of a motored mode means that the system is able to react to a start signal, for example from the grid operator or the plant operator, instantaneously or almost instantaneously (e.g. as little as a few seconds), depending on the cryogenic pump employed. This represents a significant improvement over the state of the art.

The system may be switchable between its motored mode and its power recovery mode. Optionally, the pump does not supply high-pressure cryogen to the evaporator when the system is in its motored mode. The system may be switchable from its motored mode to its power recovery mode by introducing a supply of high-pressure cryogen from the pump to the evaporator.

The electrical machine may be configured to operate as a generator and convert the mechanical power recovered by the power recovery apparatus into electrical energy when the system is in its power recovery mode. The electrical machine may be configured to drive the power recovery apparatus when the power recovery apparatus is in its motored mode. The electrical machine may be configured to operate as a motor when the system is in its motored mode.

The system may further comprise at least one valve configured to isolate the power recovery apparatus from the pump and/or the evaporator when the system is in its motored mode.

The electrical machine may be configured to be coupled to an external electrical grid. The electrical machine may be configured to supply electrical energy to the external electrical grid when the system is in its power recovery mode. The electrical machine may be configured to draw power from the external electrical grid to drive the power recovery apparatus when the system is in its motored mode. The system may further comprise an electrical breaker for coupling and/or decoupling the electrical machine to/from the electrical grid.

The power recovery apparatus may be driven at a first predetermined speed when the system is in its motored mode. The power recovery apparatus may be driven at a second predetermined speed when the system is in its power recovery mode. The first determined speed may be the same as the second predetermined speed. The first and/or second predetermined speed may be a speed required for the electrical machine to synchronise to the electrical grid.

As is known in the art, for large-capacity systems comprising sufficiently large cryogenic storage tanks, the cryogenic pump may be located inside the cryogenic tank, submerged in cryogen, so that it is maintained in a cool state by the surrounding cryogen in the tank. In small-capacity systems comprising small cryogenic tanks with insufficient space for accommodating the cryogenic pump, the cryogenic pump is located outside of the cryogenic tank.

The system may further comprise a first cooling means for cooling the pump. The first cooling means may comprise a first conduit for transporting cryogen from the cryogenic storage tank to the pump. The pump may be located within the cryogenic storage tank to permit the pump to be cooled by cryogen within the cryogenic storage tank. The first cooling mean may therefore comprise cryogen within the cryogenic storage tank.

The present inventors have realised that, unlike traditional thermodynamic power generation systems, the LAES process may be configured to allow certain steps in the start-up of a cryogenic system to be performed in anticipation of power recovery by allowing the system to operate for extended periods without exporting power to the grid and without consumption of significant quantities of cryogen working fluid, and the loss of the energy embodied within it. Furthermore, the availability of liquid air in the cryogenic storage tank while the LAES plant is in a motored mode means that the cryogenic pump may also be cooled in anticipation of power recovery. Once the cryogenic pump is cooled to operating temperature, provided that it is well insulated, the consumption of liquid air to maintain that temperature is very low; therefore, the cryogenic pump can be maintained in its cooled state for extended periods of time. Being in motored mode while maintaining the pump in a cooled state enables the reduction of the time taken to start-up the power recovery apparatus in response to a signal to generate power.

Alternatively or additionally, the system may further comprise a second cooling means for cooling the power recovery apparatus. The second cooling means may comprise a conduit for transporting cryogen from the cryogenic storage tank to the power recovery apparatus.

Therefore, the second cooling means can be used to prevent the temperature of the power recovery apparatus from rising above a threshold temperature (e.g. its maximum operating temperature). The temperature of the power recovery apparatus can be caused to rise because power dissipated in the power recovery apparatus (e.g. by bearings in the power recovery apparatus) and aerodynamic friction is in the form of heat.

The power recovery apparatus may comprise one or more turbo-expanders, or a plurality of turbo-expanders. Each turbo-expander may comprise one expansion stage, one or more expansion stages, or a plurality of expansion stages. Each expansion stage may comprise one expansion wheel, one or more expansion wheels, or a plurality of expansion wheels. One or more turbo-expanders may have all of their expansion stages connected to the drive shaft. Each expansion stage may be connected to the drive shaft.

These expansion stages may either be connected to a common drive shaft rotating at the same speed (this includes multiple shafts mechanically coupled together), or to multiple shafts rotating at different speeds and connected through a gearbox to at least one drive shaft.

As discussed above, a turbo-expander may be a rotary expansion machine comprising one or more stages of expansion, each comprising at least one expansion wheel located in a casing (expansion stages). These expansion stages may either be connected to a common drive shaft rotating at the same speed (this includes multiple shafts mechanically coupled together), or to multiple shafts rotating at different speeds and connected through a gearbox to at least one drive shaft.

An expansion stage may share at least one of said multiple shafts with at least one other expansion stage. For example, a turbo-expander may comprise four expansion stages arranged on two shafts (two stages per shaft) rotating at a first and second speed and connected via a gearbox to a drive shaft rotating at a third speed. Expansion stages may comprise more than one wheel in more than one respective casing, connected in parallel in the gas flow. The above arrangements are known in the art of power generation.

For example, as shown in FIGS. 1-6, the power recovery apparatus may comprise one turbo-expander with four expansion stages, all arranged on the same drive shaft connected to the generator.

The system may further comprise a heat exchanger configured to transfer hot thermal energy to the high-pressure gas before the high-pressure gas is expanded in the power recovery apparatus. For the purposes of the invention, hot thermal energy refers to the energy embedded within a fluid at a temperature between 80 and 300° C. The system may comprise one or more heat exchangers configured to transfer hot thermal energy to high-pressure gas before the high-pressure gas is expanded in one or more turbo-expanders or in one or more expansion stages. Hot thermal energy may be transferred to the high-pressure gas by a heat exchanger before the gas is expanded in each turbo-expander or in each expansion stage.

The system may further comprise a bypass conduit between an outlet of a downstream expansion stage and an upstream heat exchanger or expansion stage to permit, when the system is in motored mode, the flow of cold or hot gas from the downstream expansion stage to the upstream heat exchanger or expansion stage. The bypass conduit may comprise a bypass valve for controlling the flow of gas through the bypass conduit.

The system may further comprise an electric motor for driving the power recovery apparatus when the system is in the motored mode.

The system may be switchable between an idle mode and the motored mode.

Optionally, in the idle mode, the power recovery apparatus is not driven at all. In other words, optionally, in the idle mode, there is no high-pressure gas supplied by the evaporator and no electrical machine coupled to the electrical grid (electrical breaker turned off). Optionally, there is no high-pressure gas supplied by the evaporator and no electrical machine coupled to the electrical grid and any small electric motor connected to the drive shaft of the power recovery apparatus is turned off when the system is in its idle mode.

The cryogen may comprise liquid air or liquid nitrogen. The system may further comprise an exhaust in fluid communication with the power recovery apparatus.

There is also provided a method comprising:
providing a cryogenic storage tank for storing cryogen;
providing a pump in fluid communication with the cryogenic storage tank for pumping cryogen from the cryogenic storage tank to a high pressure;
providing an evaporator in fluid communication with the pump for evaporating the high-pressure cryogen from the pump to form a high-pressure gas;
providing a power recovery apparatus comprising a drive shaft for transmitting mechanical power;
providing an electrical machine mechanically coupled to the drive shaft of the power recovery apparatus for converting the mechanical power recovered by the power recovery apparatus into electrical energy, and selecting one of:
 a power recovery mode in which the power recovery apparatus is driven by and recovers mechanical power from high-pressure gas supplied by the evaporator; and
 a motored mode in which the power recovery apparatus is driven by a driving means other than high-pressure gas supplied by the evaporator.

The terms "high-pressure" and "low-pressure" are well-understood in the art, and the skilled person will understand what is meant by these terms in the context of the present invention. For example, high-pressure gas may be gas that is used to drive the power recovery apparatus when the system is in its power recovery mode. Low-pressure gas (and/or low-pressure cryogen) may be gas (and/or cryogen) that is used for purposes other than driving the power recovery apparatus e.g. for cooling components, such as the evaporator and/or pump and/or power recovery apparatus, when the system is in the motored mode.

BRIEF DESCRIPTION OF THE DRAWINGS

The present invention will now be described with reference to the accompanying drawings, in which.

DETAILED DESCRIPTION OF THE DRAWINGS

Figure 1:
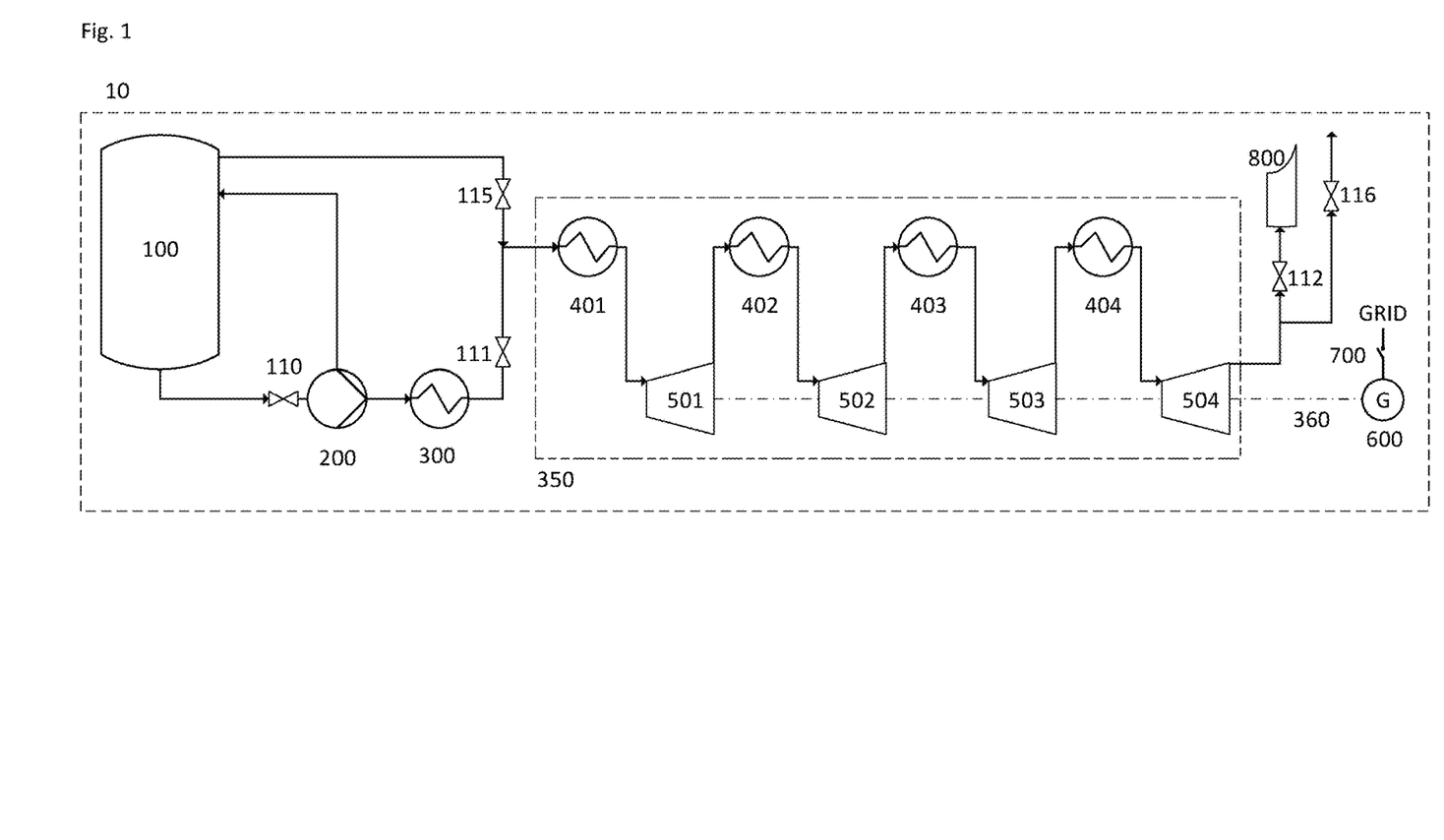
FIG. 1 shows a first system according to an embodiment of the invention.

FIG. 1 shows a system 10 according to the present invention. The system 10 comprises a cryogenic storage tank 100 for storing cryogen, a cryogenic pump 200 in fluid communication with the cryogenic storage tank 100 for pumping cryogen from the cryogenic storage tank 100 to a high pressure, an evaporator 300 in fluid communication with the pump 200 for evaporating the high-pressure cryogen from the pump 200 to form a high-pressure gas, a power recovery apparatus 350 comprising a drive shaft 360 for transmitting mechanical power, and an electrical machine 600 mechanically coupled to the drive shaft 360 of the power recovery apparatus 350 for converting the mechanical power recovered by the power recovery apparatus 350 into electrical energy. The electrical machine 600 is configured to couple to an external electrical grid via an electrical breaker 700, and is constructed, and provided with the necessary control system, as is known in the art, to allow it to operate either as a motor or as a generator, importing or exporting power from/to the grid, respectively.

The system 10 is operable in a power recovery mode in which the power recovery apparatus 350 is driven by and recovers mechanical power from high-pressure gas supplied by the evaporator 300, and a motored mode in which the power recovery apparatus 350 is driven by a driving means other than high-pressure gas supplied by the evaporator 300. The pump 200 does not supply high-pressure cryogen when the system is in its motored mode, and the system 10 is switchable from its motored mode to its power recovery mode by introducing a supply of high-pressure cryogen from the pump 200. This will be explained in further detail below.

The power recovery apparatus 350 comprises four heat exchangers 401, 402, 403 and 404, and a turbo-expander comprising four expansion stages 501, 502, 503 and 504. The system 10 also comprises an exhaust stack 800 in fluid communication with the power recovery apparatus, and valves 110, 111, 112, 115 and 116, the purpose of which will be explained below.

The system 10 also comprises a connection (e.g. a conduit) between a headspace of the cryogenic tank 100 and an inlet of the heat exchanger 401 via valve 115, and a vent downstream of the final expansion stage 504 via a valve 116.

During "normal" operation of the system 10 (i.e. in the power recovery mode), liquid cryogen (typically liquid air or liquid nitrogen) is drawn from the cryogenic tank 100, pumped to high pressure, for example from 50 to 250 bar, with cryogenic pump 200 and evaporated in evaporator 300 to produce a gas at high pressure and at near-ambient temperature, for example, from −20 to 30° C. The cold recovered from the cryogen in the evaporator 300 may be stored in a cold store (not shown) and later used to assist the cooling in an air liquefier.

The high-pressure gas is then superheated in heat exchanger 401 using ambient heat or waste heat (corresponding to a temperature comprised between 80 and 300° C.) from a separate thermal process e.g. a separate thermal process occurring in a system co-located with a LAES system and external to said LAES system such as power plants, manufacturing plants (e.g. steel works, etc.) and data centres. Waste heat used for superheating the high-pressure gas may also be generated by the LAES system itself or by the LAES system and the system co-located with said LAES system and external to said LAES system.

For example, the superheated high-pressure gas is then expanded from 140 bar to near-ambient pressure in the four expansion stages 501, 502, 503, 504. Between each expansion stage the gas is reheated in heat exchangers 402 to 404. The four expansion stages 501, 502, 503, 504 are mechanically coupled to the electrical machine 600 via the drive shaft 360. The electrical machine 600 is configured to act as a generator when the system is in the power recovery mode and converts the mechanical work in the rotation of the drive shaft 360 into electrical energy.

The skilled person will recognise that the present invention is not limited to four expansion stages, and that the choice of the number of expansion stages and their pressure ratios is a compromise between the efficiency and the cost of the system.

It is not the purpose of this description to describe in detail the start-up of the system (i.e. from a rest or idle mode), which can be implemented by a person skilled in the art. However, the main phases may be described as follows:

1. Cooling of the cryogenic pump 200 in a controlled manner to its operating temperature;
2. Spin-up of the power recovery apparatus 350 (e.g. turbo-expanders) to near nominal operating speed;
3. Fine control of the rotational speed of the electrical machine 600 rotor to synchronous speed by control of the flow of gas through the power recovery apparatus 350;
4. Closure of the breaker 700 to electro-magnetically couple the electrical machine 600 rotor to the electrical grid;
5. Power up of the power recovery apparatus 350 to increase power exported to the grid to the required value.

Step 1 typically takes between 3 or 4 hours, depending on the size and type of pump employed, as the pump is cooled from near ambient temperature to its operating temperature (typically around the saturation temperature of liquid air at near-ambient pressure; for example −170° C.) in a controlled manner to avoid thermal shock. The pump is cooled by admitting a controlled flow of liquid air into the pump. As the pump is cooled, boil-off gas is produced from the liquid air which may either be conveyed back to the headspace of the cryogenic storage tank, or vented to atmosphere. The quantity of liquid air consumed in this process is small.

Steps 2 to 4 may take between 2 and 5 minutes due to the inertia in the power recovery apparatus and electrical machine shafts and the time required to achieve synchronous speed with the required precision. This may either be achieved by:

Controlling the speed of the cryogenic pump; or,
Running the cryogenic pump at low speed and controlling the flow through at least one expansion stage using flow control means such as inlet guide vanes or a control valve; or,
Using the pressure in the head space of the cryogenic tank to deliver cryogen and controlling the flow through at least one expansion stage using flow control means.

Step 5 takes typically several tens of seconds, corresponding to the time required to spin up the cryogenic pump to its required operating speed.

This description describes the operation of a system using an electrical machine acting as a synchronous generator, wherein the generator operates at synchronous speed. The invention is also applicable to asynchronous generators, which operate at a speed slightly above synchronous speed with the grid. Asynchronous generators may also be operated as motors at a speed slightly below synchronous speed.

A skilled person will recognise that the invention offers the same advantages in reducing the time required to reach operating speed.

The present inventors have realised that, unlike traditional thermodynamic power generation systems, the LAES process may be configured to allow steps 2 to 4 to be performed in anticipation of power recovery by allowing the system to operate for extended periods without exporting power to the grid and without consumption of significant quantities of cryogen working fluid, and the loss of the energy embodied within it. Furthermore, the availability of liquid air in the cryogenic storage tanks while the LAES plant is in a motored but charged state (the cryogenic storage tank is filled with cryogen) means that step 1 may also be performed in anticipation of power recovery. Once the cryogenic pump is cooled to operating temperature, provided that it is well insulated, the consumption of liquid air to maintain that temperature is very low; therefore, the cryogenic pump can be maintained in its cooled state for extended periods of time. This allows the pump to be maintained in a cooled state, and therefore renders it worthwhile eliminating the time required for steps 2 to 4 in response to a signal to generate power.

Accordingly, the system 10 of FIG. 1 may operate in a motored mode or in a power recovery mode.

In the motored mode, the electrical machine 600 is synchronised and electro-magnetically coupled to the electrical grid and the cryogenic pump 200 is stopped but maintained in a cooled state. In other words, the system 10 has moved through steps 1 to 4 of the start-up sequence described above, but the cryogenic pump 200 has been, or has remained, stopped (depending on the above-mentioned method of achieving synchronisation). Since no pressure differential is being maintained by the cryogenic pump 200 across the expansion stages 501, 502, 503, 504, the power recovery apparatus (e.g. turbo-expander) is not producing work. As the electrical machine 600 is synchronised to the grid, it operates as a motor and rotates the drive shaft 360 of the power recovery apparatus 350. The energy required to spin the drive shaft 360 and drive the power recovery apparatus 350 corresponds only to the energy dissipated as friction in the bearings and/or gearbox of the power recovery apparatus 350 and aerodynamic friction (hereafter, friction), and is small in relation to the power output of the power recovery apparatus in power recovery mode. A further small load is required to circulate lube oil in the bearings of the power recovery apparatus 350. The total load to spin the drive shaft typically represents less than 1-3% of the rated power of the system.

In order to pass from idle (where the power recovery apparatus 350 and electrical machine 600 are stationary) to motored mode, steps 1 to 4 are undertaken normally. A small quantity of cryogen is used in order to synchronise the electrical machine 600 to the grid.

When step 4 is achieved, the flow of cryogen through the power recovery apparatus 350 is then turned down and the power recovery apparatus 350 continues to operate at synchronous speed driven by the motoring electrical machine 600.

In order to pass from the motored mode to the power recovery mode, the cryogenic pump 200 is started, raising the pressure and flow of cryogen so that the power recovery apparatus 350 becomes loaded and begins to produce work. As the work produced by the power recovery apparatus 350 exceeds the energy required to turn the output shaft 360, the electrical machine 600 begins to export power to the grid, operating as a generator. Once cooled, cryogenic pump 200 is capable of spinning up to nominal speed in a time range comprised between a few seconds and a minute, depending on its type. Therefore, the time required to transition from the motored mode to a power set-point in the power recovery mode may be as little as a few seconds.

The system 10 is therefore able to react to a start signal, for example from a grid operator or a plant operator, in as little as a few seconds, depending on the cryogenic pump employed. This represents a significant improvement over the state of the art.

With reference to FIG. 1, in motored mode, valves 111 and 112 are closed to isolate expansion stages 501, 502, 503, 504 and heat exchangers 401, 402, 403, 404 from the cryogenic pump 200 and the evaporator 300 and to prevent any moisture-loaded atmosphere air from entering into contact with the power recovery apparatus 350. Valve 110 is open so that liquid air is admitted to the cryogenic pump 200 and the boil-off gas in the pump 200 is conveyed to the headspace of the cryogenic tank 100. The cryogenic pump 200 is maintained in a cold state near its operating temperature and the expansion stages 501, 502, 503, 504 are allowed to turn, driven by the motoring electrical machine 600, which is synchronised and coupled to the grid.

The power dissipated in the bearings of the power recovery apparatus 350 and aerodynamic friction is in the form of heat. While small, over time this will cause the temperature of the power recovery apparatus 350 to rise. This is useful in maintaining the power recovery apparatus 350 in a warm state to reduce thermal shock on components when passing into the power recovery mode from the motored mode. However, it may cause the temperature to rise above maximum operating temperature of the power recovery apparatus 350. The temperature is prevented from rising above maximum operating temperature of the power recovery apparatus 350 by introducing a small flow of cold gas (e.g. boil-off gas) via the valve 115, which is in communication with the headspace of the cryogenic tank 100. The valve 116 allows the gas that is displaced by the cold gas introduced via valve 115 to be relieved. Valve 116 may be a control valve to maintain a desired temperature in the system part comprising the four heat exchangers 401, 402, 403, 404 and the power recovery apparatus 350: the temperature must be high enough to avoid thermal shock (when switching from power recovery mode to motored mode) and low enough to avoid the physical degradation of the equipment. Pressure within the system part comprising the four heat exchangers 401, 402, 403, 404 must be maintained at above ambient pressure to help prevent moisture ingress into the system part. Valve 115 may be a control valve for maintaining a desired pressure within the power recovery apparatus 350. The valves 115 and 116 may operate together to maintain the power recovery apparatus 350 within a desired temperature and/or pressure range.

When a power recovery signal is received, either from the plant operator or remotely, valves 111 and 112 are opened, valves 115 and 116 are closed and the cryogenic pump 200 is started. The system is now in the power recovery mode. The cryogenic pump 200 discharge pressure is controlled to achieve the required power output. As the power recovery apparatus 350 is loaded with high-pressure working gas, the power rises and the electrical machine 600 passes from motoring to generating (i.e. from importing to exporting power). The time taken to start the pump 200 and achieve a power set-point is determined by the ramp rate of the pump 200. Typically, nominal pump speed can be achieved in as little as a few seconds depending on cryogenic pump type. Therefore, the time taken to pass from motored mode, where the system 10 is consuming a very small quantity of electricity from the grid and a very small quantity of liquid air from the storage tank 100, to power recovery mode, where the system 10 is producing electricity for the grid, may be as little as a few seconds.

A further advantage may be derived from operating the system 10 in motored mode, as the electrical machine, even operating as a motor, may be controlled to absorb or supply reactive power by adjustment of the excitation of the field winding, similarly to a synchronous condenser. This can be used to contribute to the control of the local voltage on the grid. Furthermore, the spinning of the power recovery apparatus 350 and the electrical machine 600 shafts contributes inertia to the grid, which contributes to the damping of frequency deviations in the electrical waveform.

Figure 2:
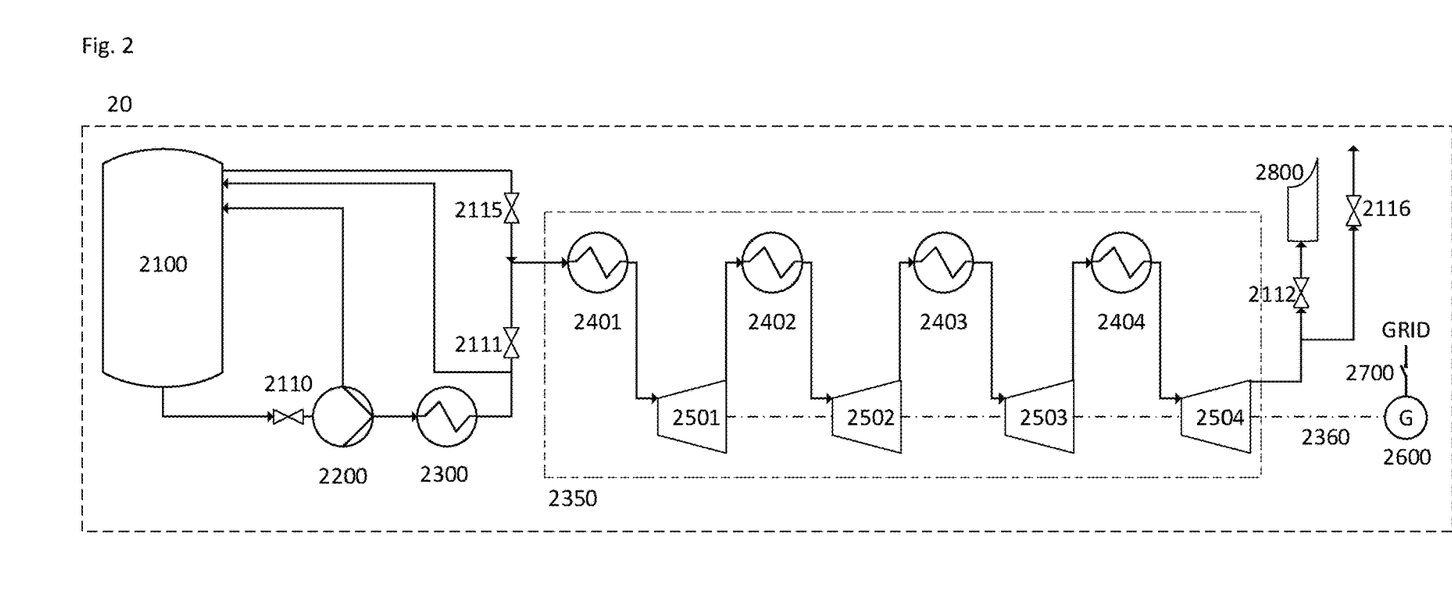
FIG. 2 shows a second system according to an embodiment of the invention.

Some items of equipment are sensitive to thermal shock. The skilled person will understand this to mean a rapid change in temperature that induces rapid expansion or contraction resulting in a distortion of the component material, which can contribute to component fatigue and problems with temporary unintended interaction of different components. It is therefore necessary in some cases to limit the rate of change of temperature in certain items of equipment to reduce thermal shock. FIG. 2 shows a system 20 which achieves this.

The system 20 is identical to the system 10, and operates as described above with respect to FIG. 1, except that a further connection is provided between the pipework downstream of the evaporator 2300 and the headspace of the tank. The system 20 comprises a cryogenic storage tank 2100 for storing cryogen, a cryogenic pump 2200 in fluid communication with the cryogenic storage tank 2100 for pumping cryogen from the cryogenic storage tank 2100 to a high pressure, an evaporator 2300 in fluid communication with the pump 2200 for evaporating the high-pressure cryogen from the pump 2200 to form a high-pressure gas, a power recovery apparatus 2350 comprising a drive shaft 2360 for transmitting mechanical power, and an electrical machine 2600 mechanically coupled to the drive shaft 2360 of the power recovery apparatus 2350 for converting the mechanical power recovered by the power recovery apparatus 2350 into electrical energy. The electrical machine 2600 is configured to couple to an external electrical grid via an electrical breaker 2700, and is constructed, and provided with the necessary control system, as is known in the art, to allow it to operate either as a motor or as a generator, importing or exporting power from the grid respectively.

Like system 10, system 20 is operable in a power recovery mode in which the power recovery apparatus 2350 is driven by and recovers mechanical power from high-pressure gas supplied by the evaporator 2300, and a motored mode in which the power recovery apparatus 2350 is driven by a driving means other than high-pressure gas supplied by the evaporator 2300. The pump 2200 does not supply high-pressure cryogen when the system is in its motored mode, and the system 20 is switchable from its motored mode to its power recovery mode by introducing a supply of high-pressure cryogen from the pump 2200, as described above with respect to FIG. 1.

The power recovery apparatus 2350 comprises four heat exchangers 2401, 2402, 2403 and 2404, and a turbo-expander comprising four expansion stages 2501, 2502, 2503 and 2504. The system 20 also comprises an exhaust stack 2800 in fluid communication with the power recovery apparatus, and valves 2110, 2111, 2112, 2115 and 2116.

The evaporator 2300 may be designed to withstand thermal shock as cold cryogen is delivered to it and warmed to near ambient temperature. However, it may be preferable, for example to reduce the cost of the system 20, to use an evaporator that cannot withstand rapid thermal shocks, and to maintain it at a cold temperature in the same manner as the cryogenic pump 2200. In the system 20 switched in motored mode, some low-pressure cryogen may be allowed through the static cryogenic pump 2200 to the evaporator 2300 in order to maintain both of them in a cooled state. Boil-off produced as the evaporator 2300 is cooled, and by heat ingress at the evaporator 2300, is conveyed back to the headspace of the tank 2100 (it may alternatively be ejected to atmosphere).

Figure 3:
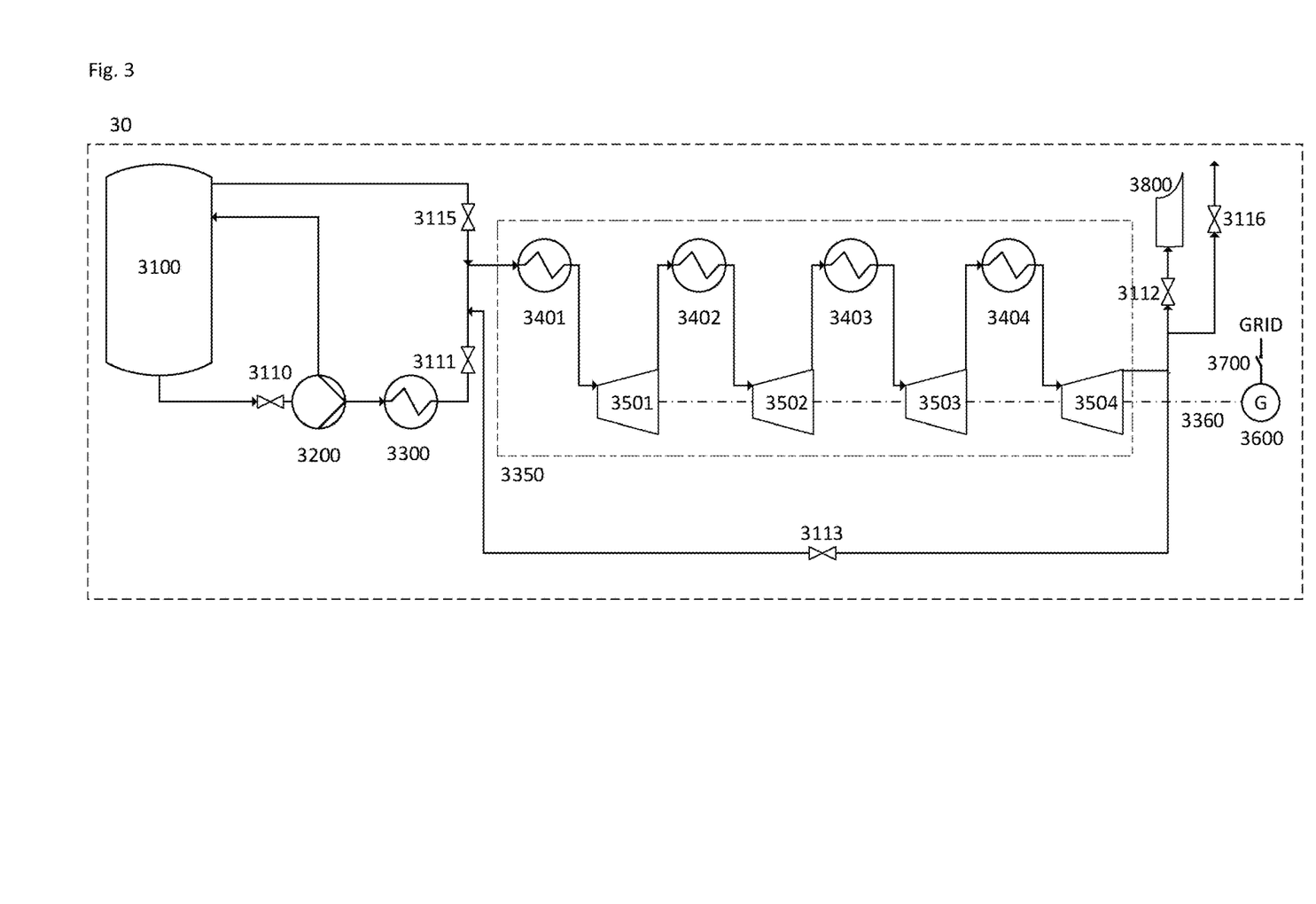
FIG. 3 shows a third system according to an embodiment of the invention.

A third system 30 is shown in FIG. 3. It is identical to the system 10, and operates as described above with respect to FIG. 1 and FIG. 2, except that a further connection is provided between the discharge of expansion stage 3504 and the inlet of heat exchanger 3401 via a bypass valve 3113.

The system 30 comprises a cryogenic storage tank 3100 for storing cryogen, a cryogenic pump 3200 in fluid communication with the cryogenic storage tank 3100 for pumping cryogen from the cryogenic storage tank 3100 to a high pressure, an evaporator 3300 in fluid communication with the pump 3200 for evaporating the high-pressure cryogen from the pump 3200 to form a high-pressure gas, a power recovery apparatus 3350 comprising a drive shaft 3360 for transmitting mechanical power, and an electrical machine 3600 mechanically coupled to the drive shaft 3360 of the power recovery apparatus 3350 for converting the mechanical power recovered by the power recovery apparatus 3350 into electrical energy. The electrical machine 3600 is configured to couple to an external electrical grid via an electrical breaker 3700, and is constructed, and provided with the necessary control system, as is known in the art, to allow it to operate either as a motor or as a generator, importing or exporting power from the grid respectively.

Like systems 10 and 20, system 30 is operable in a power recovery mode in which the power recovery apparatus 3350 is driven by and recovers mechanical power from high-pressure gas supplied by the evaporator 3300, and a motored mode in which the power recovery apparatus 3350 is driven by a driving means other than high-pressure gas supplied by the evaporator 3300. The pump 3200 does not supply high-pressure cryogen when the system is in its motored mode, and the system 30 is switchable from its motored mode to its power recovery mode by introducing a supply of high-pressure cryogen from the pump 3200, as described above with respect to FIG. 1.

The power recovery apparatus 3350 comprises four heat exchangers 3401, 3402, 3403 and 3404, and an expander (e.g. a turbo-expander or a turbine) comprising four expansion stages 3501, 3502, 3503 and 3504. The system 30 also comprises an exhaust stack 3800 in fluid communication with the power recovery apparatus, and valves 3110, 3111, 3112, 3113, 3115 and 3116.

During normal operation (power recovery mode), the system 30 operates identically to system 10 and the valve 3113 is closed.

In motored mode, the system 30 operates identically to the first system 10 and the bypass valve 3113 is open and at least one of heat exchangers 3401 to 3404 is supplied with heat, for example at a temperature comprised between 80 and 300° C. The pressure differential caused by the rotation of the power recovery apparatus 3350 causes a small recirculation flow through the bypass connection. The heat dissipated at the bearings and in the power recovery apparatus 3350 due to aerodynamic friction is transferred in the recirculation flow around the bypass loop.

When a power recovery signal is received, either from the plant operator or remotely, valves 3111 and 3112 are opened, valves 3115 and 3116 and bypass valve 3113 are closed and the cryogenic pump 3200 is started. The system 30 is now in the power recovery mode.

This system 30 offers the particular advantage of maintaining all components in the bypass loop in a warmed state. Once again, temperature may be controlled by introducing cold gas via valve 3115.

Because the power dissipated in the power recovery apparatus during motored mode is low, it may take a while to reach the desired operating temperature. The time taken may be reduced by introducing heat into at least one of heat exchangers until the required temperature is reached. Alternatively, if the rate of heat dissipation from the power recovery apparatus is not sufficient, heat may continuously be provided at the heat exchanger during motored mode.

The heat provided may be from the same waste heat source as is used for reheat in power recovery mode. If that waste heat source is not continuously available, a thermal store may be used to store the heat when it is available and supply heat to the bypassed loop when the waste heat source is not available. The thermal store may be used to supply heat during power recovery, or it may be a small thermal store with enough capacity to supply heat to the system only during motored mode.

In a complete LAES system (including systems using liquid nitrogen), the power recovery systems shown in FIGS. 1 to 3 may form part of a larger LAES system also comprising an air liquefier for supplying liquid air to cryogenic tank. The skilled person will recognise that the power recovery system may operate in motored mode independently of the operation of the air liquefier, as it does not interact with the source of cryogen into the tank.

Figure 4:
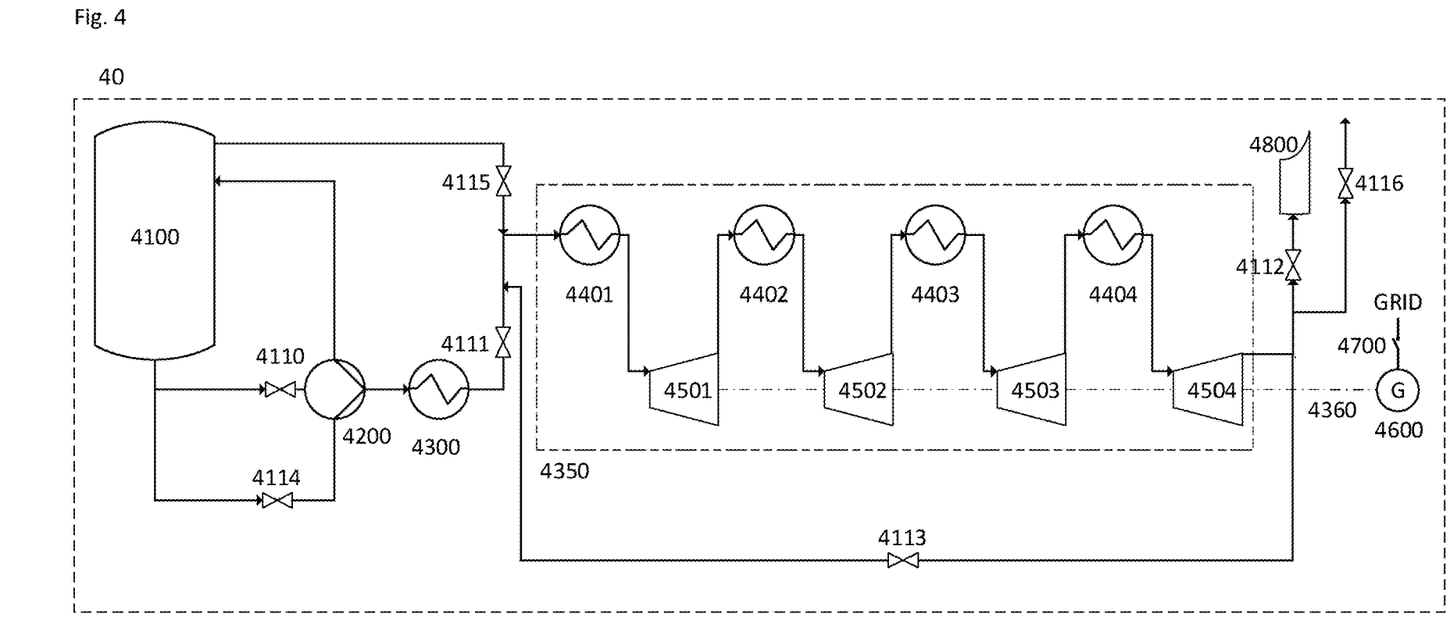
FIG. 4 shows a fourth system according to an embodiment of the invention.

A fourth system 40 is shown in FIG. 4. It is identical to the system 30 except that it is also provided with an extra connection between the cryogenic tank 4100 and the cryogenic pump 4200 via valve 4114.

The system 40 comprises a cryogenic storage tank 4100 for storing cryogen, a cryogenic pump 4200 in fluid communication with the cryogenic storage tank 4100 for pumping cryogen from the cryogenic storage tank 4100 to a high pressure, an evaporator 4300 in fluid communication with the pump 4200 for evaporating the high-pressure cryogen from the pump 4200 to form a high-pressure gas, a power recovery apparatus 4350 comprising a drive shaft 4360 for transmitting mechanical power, and an electrical machine 4600 mechanically coupled to the drive shaft 4360 of the power recovery apparatus 4350 for converting the mechanical power recovered by the power recovery apparatus 4350 into electrical energy. The electrical machine 4600 is configured to couple to an external electrical grid via an electrical breaker 4700, and is constructed, and provided with the necessary control system, as is known in the art, to allow it to operate either as a motor or as a generator, importing or exporting power from the grid respectively.

Like systems 10, 20 and 30, system 40 is operable in a power recovery mode in which the power recovery apparatus 4350 is driven by and recovers mechanical power from high-pressure gas supplied by the evaporator 4300, and a motored mode in which the power recovery apparatus 4350 is driven by a driving means other than high-pressure gas supplied by the evaporator 4300. The pump 4200 does not supply high-pressure cryogen when the system is in its motored mode, and the system 40 is switchable from its motored mode to its power recovery mode by introducing a supply of high-pressure cryogen from the pump 4200, as described above with respect to FIG. 1.

The power recovery apparatus 4350 comprises four heat exchangers 4401, 4402, 4403 and 4404, and a turbo-expander comprising four expansion stages 4501, 4502, 4503 and 4504. The system 40 also comprises an exhaust stack 4800 in fluid communication with the power recovery apparatus, and valves 4110, 4111, 4112, 4113, 4114, 4115 and 4116.

During cooling down of the pump and during motored mode, isolation valve 4110 remains closed and liquid air is admitted to the pump 4200 via valve 4114. This allows a smaller bore pipe to be used, which can limit flow. Furthermore, if any fine control of the flow is required, a small control valve 4114 may be used, and the large bore valve 4110 may be a simpler isolation valve with no fine position control. This can reduce costs.

The fourth embodiment is intended to show an alternative method of maintaining the pump in the cooled state. A skilled person will understand that other suitable arrangements using the principle set out in FIG. 4 can also achieve this.

Figure 5:
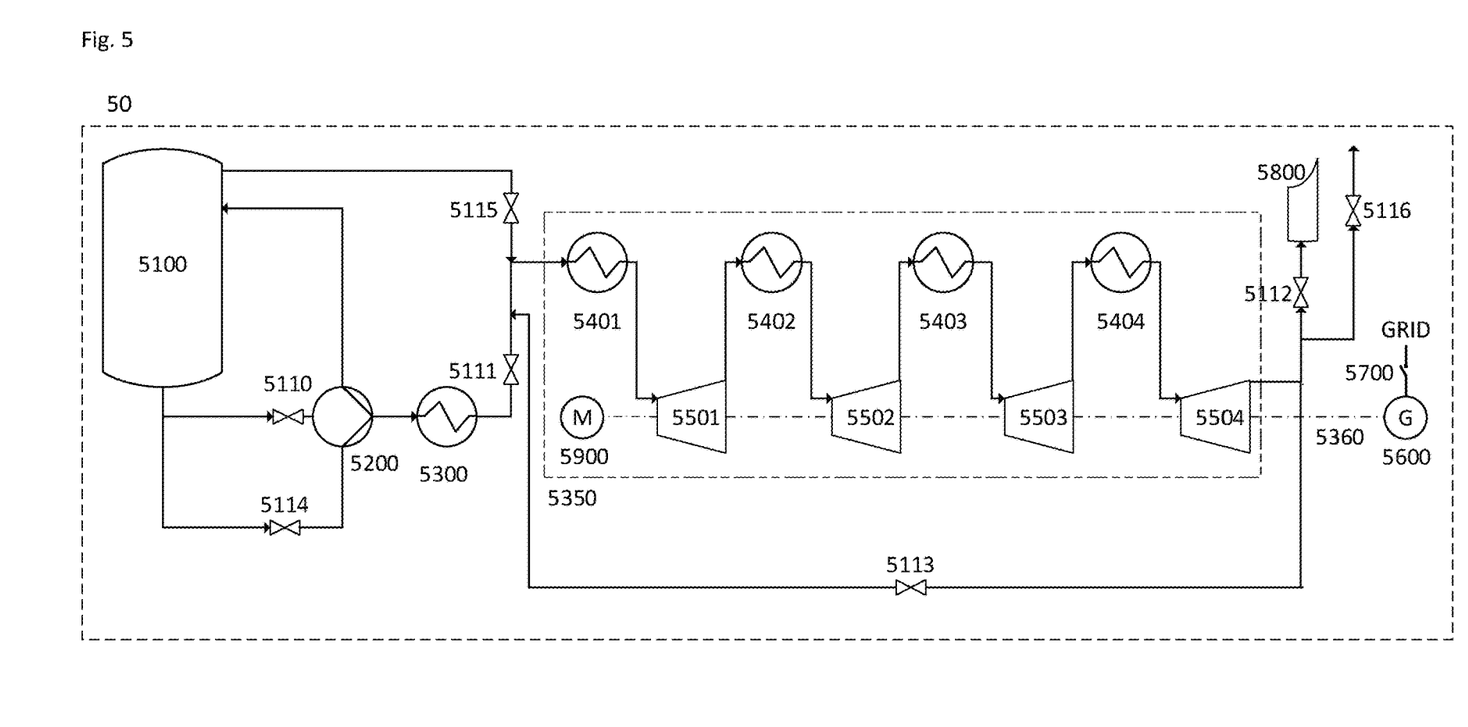
FIG. 5 shows a fifth system according to an embodiment of the invention.

FIG. 5 shows a fifth system 50 which is the same as the system 40 but with the addition of an additional motor 5900, such as a small electric motor, connected to the four expansion stages via a shaft.

The system 50 comprises a cryogenic storage tank 5100 for storing cryogen, a cryogenic pump 5200 in fluid communication with the cryogenic storage tank 5100 for pumping cryogen from the cryogenic storage tank 5100 to a high pressure, an evaporator 5300 in fluid communication with the pump 5200 for evaporating the high-pressure cryogen from the pump 5200 to form a high-pressure gas, a power recovery apparatus 5350 comprising a drive shaft 5360 for transmitting mechanical power, and an electrical machine 5600 mechanically coupled to the drive shaft 5360 of the power recovery apparatus 5350 for converting the mechanical power recovered by the power recovery apparatus 5350 into electrical energy. The electrical machine 5600 is configured to couple to an external electrical grid via an electrical breaker 5700, and is constructed, and provided with the necessary control system, as is known in the art, to allow it to operate either as a motor or as a generator, importing or exporting power from the grid respectively.

Like systems 10, 20, 30 and 40, system 50 is operable in a power recovery mode in which the power recovery apparatus 5350 is driven by and recovers mechanical power from high-pressure gas supplied by the evaporator 5300, and a motored mode in which the power recovery apparatus 5350 is driven by a driving means other than high-pressure gas supplied by the evaporator 5300. The pump 5200 does not supply high-pressure cryogen when the system is in its motored mode, and the system 50 is switchable from its motored mode to its power recovery mode by introducing a supply of high-pressure cryogen from the pump 5200, as described above with respect to FIG. 1.

The power recovery apparatus 5350 comprises four heat exchangers 5401, 5402, 5403 and 5404, and a turbo-expander comprising four expansion stages 5501, 5502, 5503 and 5504. The system 50 also comprises an exhaust stack 5800 in fluid communication with the power recovery apparatus, and valves 5110, 5111, 5112, 5113, 5114, 5115 and 5116.

In motored mode, the small electric motor 5900 spins the four expansion stages 5501, 5502, 5503, 5504 of the power recovery apparatus 5350 and the electrical machine 5600 until they reach their synchronous speed and the electrical machine 5600 is coupled to the grid. Subsequently, the small electric motor 5900 hands over the responsibility of driving the four expansion stages 5501, 5502, 5503, 5504 of the power recovery apparatus 5350 to the electrical machine 5600.

The small amount of power required to power the small electric motor 5900 may be preferable to the small quantity of cryogen required to bring the power recovery apparatus 5350 and the electrical machine 5600 up to their synchronous speeds in systems 10, 20, 30, 40.

Figure 6:
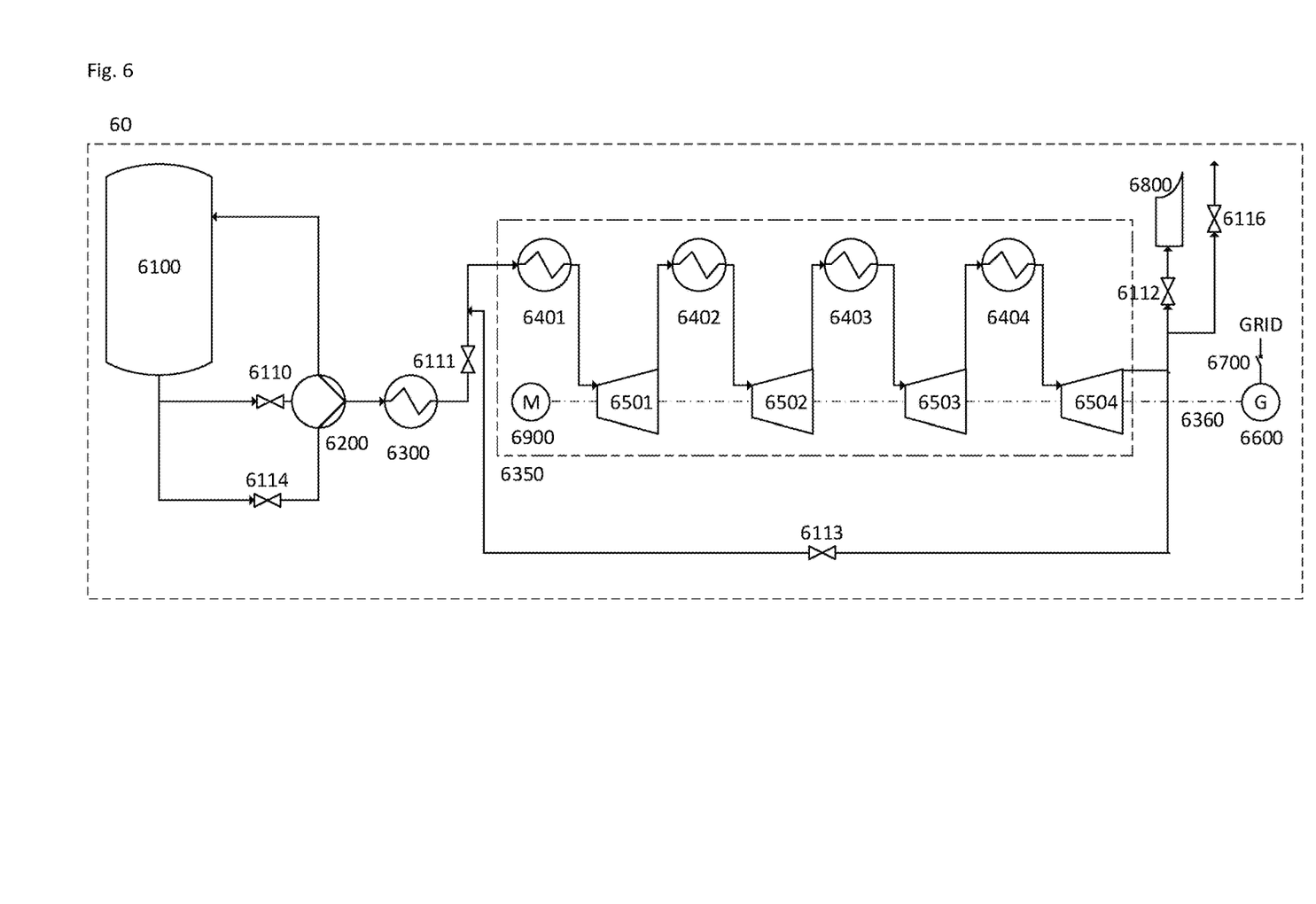
FIG. 6 shows a sixth system according to an embodiment of the invention.

FIG. 6 shows a sixth system 60 which is the same as the system 50, except that no connection is provided between the headspace of cryogenic tank 6100 and the heat exchanger 6401 via valve 5115. Instead, a small amount of cold gas from the pump is allowed to flow through valve 6111 toward the four expansion stages.

The system 60 comprises a cryogenic storage tank 6100 for storing cryogen, a cryogenic pump 6200 in fluid communication with the cryogenic storage tank 6100 for pumping cryogen from the cryogenic storage tank 6100 to a high pressure, an evaporator 6300 in fluid communication with the pump 6200 for evaporating the high-pressure cryogen from the pump 6200 to form a high-pressure gas, a power recovery apparatus 6350 comprising a drive shaft 6360 for transmitting mechanical power, and an electrical machine 6600 mechanically coupled to the drive shaft 6360 of the power recovery apparatus 6350 for converting the mechanical power recovered by the power recovery apparatus 6350 into electrical energy. The electrical machine 6600 is configured to couple to an external electrical grid via an electrical breaker 6700, and is constructed, and provided with the necessary control system, as is known in the art, to allow it to operate either as a motor or as a generator, importing or exporting power from the grid respectively.

Like systems 10, 20, 30, 40 and 50, system 60 is operable in a power recovery mode in which the power recovery apparatus 6350 is driven by and recovers mechanical power from high-pressure gas supplied by the evaporator 6300, and a motored mode in which the power recovery apparatus 6350 is driven by a driving means other than high-pressure gas supplied by the evaporator 6300. The pump 6200 does not supply high-pressure cryogen when the system is in its motored mode, and the system 60 is switchable from its motored mode to its power recovery mode by introducing a supply of high-pressure cryogen from the pump 6200, as described above with respect to FIG. 1.

The power recovery apparatus 6350 comprises four heat exchangers 6401, 6402, 6403 and 6404, and a turbo-expander comprising four expansion stages 6501, 6502, 6503 and 6504. The system 60 also comprises an exhaust stack 6800 in fluid communication with the power recovery apparatus, and valves 6110, 6111, 6112, 6113, 6114 and 6116.

The arrangement shown in FIG. 6 eliminates valve 5115 (when compared to FIG. 5), which could fail during power recovery mode, exposing the cryogenic tank 6100 to high pressure produced by the cryogenic pump 6200.

The terms "high-pressure" and "low-pressure" are well-understood in the art, and the skilled person will understand what is meant by these terms in the context of the present invention. For example, high-pressure gas may be gas that is used to drive the power recovery apparatus when the system is in its power recovery mode. Low-pressure gas (and/or low-pressure cryogen) may be gas (and/or cryogen) that is used for purposes other than driving the power recovery apparatus e.g. for cooling components, such as the evaporator and/or pump and/or power recovery apparatus, when the system is in the motored mode.

As mentioned previously, step 5 (power up of the power recovery apparatus 350 to increase power exported to the grid to the required value) takes typically several tens of seconds, corresponding to the time required to spin up the cryogenic pump to its required operating speed in order for the power recovery apparatus to supply the level of electric power required by the grid operator to the external electrical grid.

The present inventors have further found an elegant way to remove step 5 from the response time so as to be able to instantaneously export power in response to the grid operator's orders. To do so, an electrical battery sub-system 80 may be integrated within any of the systems 10, 20, 30, 40, 50 or 60.

Figure 7:
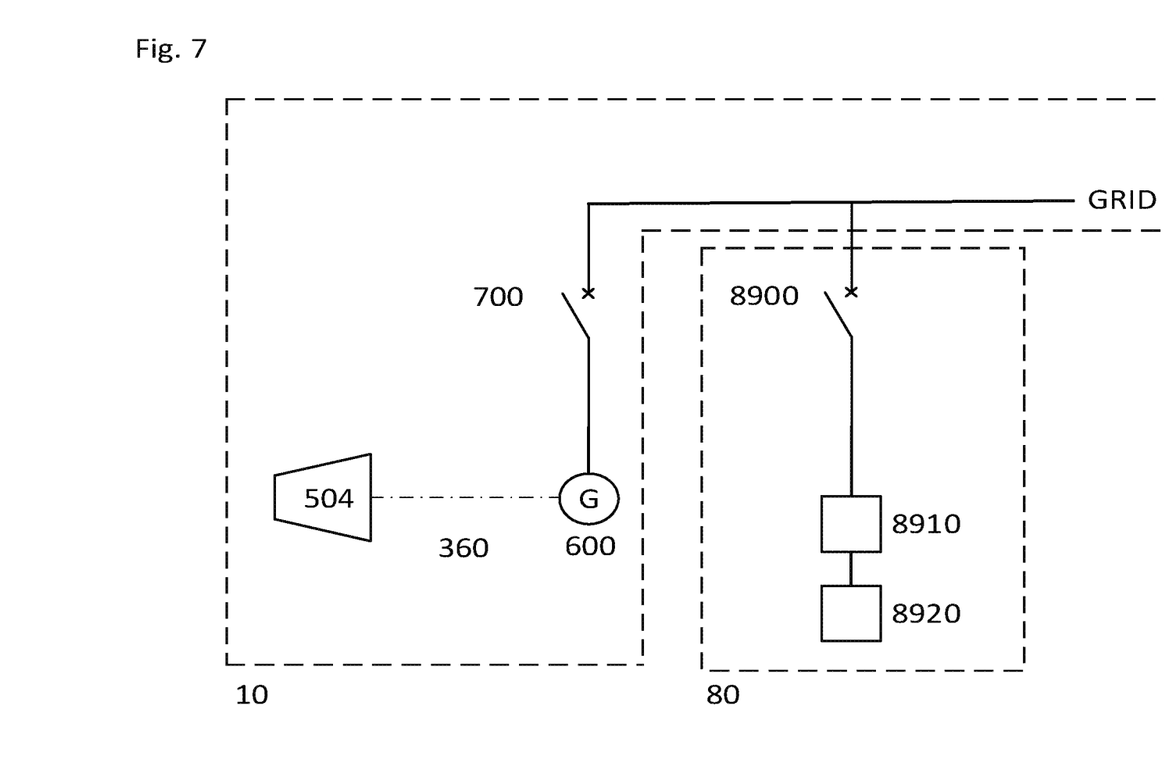
FIG. 7 shows a seventh system according to an embodiment of the invention.

FIG. 7 depicts the integration of the electrical battery sub-system 80 within system 10. In the same manner, the electrical battery sub-system 80 could be integrated within system 20, 30, 40, 50 or 60. For the sake of clarity, part of the system 10 is depicted in FIG. 7. The electrical breaker shown in FIGS. 1 to 6 and used to electrically couple the electrical generator to the external electrical grid is referred to as the first electrical breaker. The electrical battery sub-system 80 comprises a battery 8920 electrically coupled via an inverter 8910 (i.e. a rectifier) and a breaker 8900 to the electrical grid.

It shall be recalled that the terminals of the electrical generator 600 are coupled to the electrical grid via the breaker 700.

During either idle or motoring mode, the battery 8920 may be charged under the control of inverter 8910. In idle mode, the breaker 700 is open and electrical generator 600 is not coupled to the electrical grid. In motoring mode, the electrical generator 600 is synchronously coupled to the electrical grid via the breaker 700, which is closed.

Once the battery 8920 is sufficiently charged, the breaker 8900 may either remain closed (since charging is controlled by the inverter) or be opened. The breaker 8900 will typically remain closed to allow the inverter to rapidly control the charge and discharge of the battery, and will usually be opened for maintenance, as is known in the art.

When in motoring mode and a signal is received to export power, the system 10 moves into power recovery mode. The cryogenic pump 200 is ramped to full power and the generator exports electrical power to the electrical grid (step 5). Simultaneously, the inverter 8910 controls the battery 8920 to discharge instantaneously. The inverter 8910 controls the power exported by the battery 8920 such that the total power exported by the electrical grid achieves the required set-point. As the cryogenic pump 200 ramps up to the required set point, the power exported by the battery is ramped down such that the set point is maintained.

A person skilled in the art will recognise that in order to instantaneously achieve a set point as high as the maximum output of the generator, the battery must be sized with the same power rating as the generator.

An advantage of the electrical battery sub-system 80 is that the system may respond to power export signals at the near-instantaneous rate of a battery; however, the advantages of the cryogenic system are maintained. The battery need only be relatively small since it is only required to operate for the short period required to ramp the cryogenic pump.

The present invention has been described above in exemplary form with reference to the accompanying drawings which each represent a single embodiment of the invention. It will be understood that many different embodiments of the invention exist, and that these embodiments all fall within the scope of the invention as defined by the following claims.

The invention claimed is:

1. A cryogenic power recovery system comprising:
a cryogenic storage tank for storing cryogen;
a pump in fluid communication with the cryogenic storage tank for pumping cryogen from the cryogenic storage tank to a high pressure;
an evaporator in fluid communication with the pump for evaporating the high-pressure cryogen from the pump to form a high-pressure gas;
a power recovery apparatus comprising a drive shaft for transmitting mechanical power; and
an electrical machine mechanically coupled to the drive shaft of the power recovery apparatus for converting the mechanical power recovered by the power recovery apparatus into electrical energy,
wherein the system is operable in:
a power recovery mode in which the power recovery apparatus is driven by and recovers mechanical power from high-pressure gas supplied by the evaporator and wherein the electrical machine is configured to operate as a generator and convert the mechanical power recovered by the power recovery apparatus into electrical energy when the system is in its power recovery mode; and
a motored mode in which the power recovery apparatus is driven by a driving means other than high-pressure gas supplied by the evaporator.

2. A cryogenic power recovery system according to claim 1, wherein the system is switchable between its motored mode and its power recovery mode.

3. A cryogenic power recovery system according to claim 1, wherein the pump does not supply high-pressure cryogen to the evaporator when the system is in its motored mode.

4. A cryogenic power recovery system according to claim 1, wherein the system is switchable from its motored mode to its power recovery mode by introducing a supply of high-pressure cryogen from the pump to the evaporator.

5. A cryogenic power recovery system according to claim 2, wherein the pump does not supply high-pressure cryogen to the evaporator when the system is in its motored mode.

6. A cryogenic power recovery system according to claim 1, wherein the electrical machine is configured to drive the power recovery apparatus and to operate as a motor when the power recovery apparatus is in its motored mode.

7. A cryogenic power recovery system according to claim 1, further comprising at least one valve configured to isolate the power recovery apparatus from the pump and/or the evaporator when the system is in its motored mode.

8. A cryogenic power recovery system according to claim 1, wherein the electrical machine is configured to be coupled to an external electrical grid to supply electrical energy to the external electrical grid when the system is in its power recovery mode and to draw power from the external electrical grid to drive the power recovery apparatus when the system is in its motored mode.

9. A cryogenic power recovery system according to claim 8, further comprising an electrical breaker for coupling and/or decoupling the electrical machine to/from the electrical grid.

10. A cryogenic power recovery system according to claim 1, wherein the power recovery apparatus is driven at a first predetermined speed when the system is in its motored mode and is driven at a second predetermined speed when the system is in its power recovery mode.

11. A cryogenic power recovery system according to claim 10, wherein the first predetermined speed is the same as the second predetermined speed.

12. A cryogenic power recovery system according to claim 10, wherein the first predetermined speed and/or the second predetermined speed is a speed required for the electrical machine to synchronise to the electrical grid.

13. A cryogenic power recovery system according to claim 1, further comprising a first cooling means for cooling the pump.

14. A cryogenic power recovery system according to claim 13, wherein the first cooling means comprises cryogen within the cryogenic storage tank and the pump is located within the cryogenic storage tank to permit the pump to be cooled by cryogen within the cryogenic storage tank.

15. A cryogenic power recovery system according to claim 13, wherein the first cooling means comprises cryogen within the cryogen storage tank and a first conduit for transporting cryogen from the cryogenic storage tank to the pump.

16. A cryogenic power recovery system according to claim 13, further comprising a second cooling means for cooling the power recovery apparatus and wherein the second cooling means comprises a second conduit for transporting cryogen from the cryogenic storage tank to the power recovery apparatus.

17. A cryogenic power recovery system according to claim 1, wherein the power recovery apparatus comprises at least one turbo-expander.

18. A cryogenic power recovery system according to claim 17, wherein the at least one turbo-expander comprises one or more expansion stages.

19. A cryogenic power recovery system according to claim 18, wherein the power recovery apparatus comprises one or more expansion wheels.

20. A cryogenic power recovery system according to claim 18, wherein each expansion stage of the at least one turbo-expander is connected to the drive shaft.

21. A cryogenic power recovery system according to claim 1, further comprising a heat exchanger configured to transfer hot thermal energy to gas before the gas is expanded in the power recovery apparatus.

22. A cryogenic power recovery system according to claim 17, comprising one or more heat exchangers configured to transfer hot thermal energy to gas before the gas is expanded in the at least one turbo-expander.

23. A cryogenic power recovery system according to claim 18, further comprising a bypass conduit between an outlet of a downstream expansion stage and an upstream heat exchanger or expansion stage to permit the flow of cold or hot gas from the downstream expansion stage to the upstream heat exchanger or expansion stage.

24. A cryogenic power recovery system according to claim 23, wherein the bypass conduit is configured to operate only when the system is in its motored mode and comprises a bypass valve for controlling the flow of gas through the bypass conduit.

25. A cryogenic power recovery system according to claim 18, comprising one or more heat exchangers configured to transfer hot thermal energy to gas before the gas is expanded in the one or more expansion stages of the at least one turbo-expander.

26. A cryogenic power recovery system according to claim 25, wherein hot thermal energy is transferred to gas by a heat exchanger before the gas is expanded in each expansion stage.

27. A cryogenic power recovery system according to claim 26, further comprising a bypass conduit between an outlet of a downstream expansion stage and an upstream heat exchanger or expansion stage to permit the flow of cold or hot gas from the downstream expansion stage to the upstream heat exchanger or expansion stage.

28. A cryogenic power recovery system according to claim 1, further comprising an electric motor for driving the power recovery apparatus when the system is in the motored mode.

29. A cryogenic power recovery system according to claim 1, wherein the system is switchable between an idle mode and the motored mode and the power recovery apparatus is not driven when the system is in its idle mode.

30. A cryogenic power recovery system according to claim 29, wherein the electrical machine is not coupled to the electrical grid when the system is in its idle mode, and wherein the evaporator does not supply high-pressure gas to the power recovery apparatus when the system is in the idle mode.

31. A cryogenic power recovery system according to claim 1, wherein the cryogen comprises liquid air or liquid nitrogen.

32. A cryogenic power recovery system according to claim 1, further comprising an exhaust in fluid communication with the power recovery apparatus.

33. A cryogenic power recovery system according to claim 1, comprising means for transporting low-pressure cryogen from the cryogenic storage tank through the pump to the evaporator when the system is in its motored mode to keep the pump and the evaporator in a cooled state.

34. The cryogenic power recovery system according to claim 1, wherein the driving means does not store energy when the system is in the motored mode.

35. A method for operating a cryogenic power recovery system, the method comprising:
   providing a cryogenic storage tank for storing cryogen;
   providing a pump in fluid communication with the cryogenic storage tank for pumping cryogen from the cryogenic storage tank to a high pressure;
   providing an evaporator in fluid communication with the pump for evaporating the high-pressure cryogen from the pump to form a high-pressure gas;
   providing a power recovery apparatus comprising a drive shaft for transmitting mechanical power;
   providing an electrical machine mechanically coupled to the drive shaft of the power recovery apparatus for converting the mechanical power recovered by the power recovery apparatus into electrical energy, and selecting one of:
      a power recovery mode in which the power recovery apparatus is driven by and recovers mechanical power from high-pressure gas supplied by the evaporator; and
      a motored mode in which the power recovery apparatus is driven by a driving means other than high-pressure gas supplied by the evaporator,
   wherein the system is operable in the power recovery mode and in the motored mode.

36. The cryogenic power recovery system according to claim 35, further comprising switching between the power recovery mode and the motored mode.

* * * * *